(12) United States Patent
Kalamkar et al.

(10) Patent No.: US 11,782,982 B1
(45) Date of Patent: Oct. 10, 2023

(54) OFFSET-BASED WATERMARKS FOR DATA STREAM PROCESSING

(71) Applicant: INTUIT INC., Mountain View, CA (US)

(72) Inventors: Amit Kalamkar, Fremont, CA (US); Vigith Maurice, Portland, OR (US); Juanlu Yu, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/176,423

(22) Filed: Feb. 28, 2023

(51) Int. Cl.
*G06F 16/2455* (2019.01)
*G06F 16/901* (2019.01)
*G06F 21/16* (2013.01)

(52) U.S. Cl.
CPC .... *G06F 16/9024* (2019.01); *G06F 16/24568* (2019.01); *G06F 21/16* (2013.01)

(58) Field of Classification Search
CPC . G06F 16/9024; G06F 16/24568; G06F 21/16
See application file for complete search history.

(56) References Cited

U.S. PATENT DOCUMENTS

| | | | | |
|---|---|---|---|---|
| 11,259,057 B2 * | 2/2022 | Bieber | ............. | H04N 21/23897 |
| 11,640,338 B2 * | 5/2023 | Littlefield | ............... | G06F 3/065 |
| | | | | 711/162 |
| 11,640,449 B2 * | 5/2023 | Groth | ..................... | G06N 20/10 |
| | | | | 726/26 |
| 2004/0015760 A1 * | 1/2004 | Naegle | ..................... | H04L 69/22 |
| | | | | 714/732 |
| 2012/0137277 A1 * | 5/2012 | Varadarajan | ............ | G06F 8/433 |
| | | | | 717/155 |
| 2015/0227760 A1 * | 8/2015 | Sella | ..................... | H04L 9/3236 |
| | | | | 726/30 |
| 2015/0261886 A1 * | 9/2015 | Wu | ..................... | G06F 16/9024 |
| | | | | 707/798 |
| 2018/0137155 A1 * | 5/2018 | Majumdar | .......... | G06F 16/9024 |
| 2019/0335213 A1 * | 10/2019 | Bieber | ............. | H04N 21/23897 |
| 2020/0034468 A1 * | 1/2020 | Lei | ......................... | G06F 16/27 |
| 2020/0183604 A1 * | 6/2020 | Elyasi | ................ | G06F 16/9024 |
| 2020/0204875 A1 * | 6/2020 | Nielsen | ............. | H04N 21/8456 |
| 2020/0265090 A1 * | 8/2020 | Hilloulin | ............. | G06F 16/9024 |
| 2021/0357403 A1 * | 11/2021 | Dash | ................ | G06F 16/24532 |
| 2022/0103618 A1 * | 3/2022 | Pinheiro | ................ | H04L 67/60 |

(Continued)

FOREIGN PATENT DOCUMENTS

| | | | | |
|---|---|---|---|---|
| CN | 111651735 A | * | 9/2020 | ............. G06F 21/16 |
| EP | 2692135 B1 | * | 10/2017 | ........... G06T 1/0071 |

*Primary Examiner* — Jorge A Casanova
(74) *Attorney, Agent, or Firm* — Patterson + Sheridan, LLP

(57) ABSTRACT

Aspects of the present disclosure relate to watermarks and watermarking techniques for data streaming pipelines. Time stamp and offset timeline data is shared by computing instances along the pipeline to enable improved watermarking of the data stream through the pipeline. The improved watermarks enable better determination of completeness for the data stream and improve materialization of the results. The watermarking techniques can include periodically publishing watermark data by processing units of a vertex, fetching a merged watermark for a vertex by a vertex, and/or watching a data storage for the watermark data for events. Consensus algorithms can be used to maintain consensus among vertices for the watermark data.

20 Claims, 8 Drawing Sheets

(56) References Cited

U.S. PATENT DOCUMENTS

| | | | |
|---|---|---|---|
| 2022/0264175 A1* | 8/2022 | Fahnestock | H04N 21/44222 |
| 2023/0091103 A1* | 3/2023 | Tohlen | H04N 19/184 |
| | | | 341/87 |

* cited by examiner

| Partition | Terminal Offset | Log Append Time | Watermark V1 (kp1, kp2) | ISB (V1) Offset |
|---|---|---|---|---|
| kp1 | 1 | 10 | 0 | 23 |
| kp2 | 10 | 9 | 9 (10,9) | 24 |
| kp1 | 2 | 11 | 9 (11,9) | 25 |
| kp2 | 11 | 11 | 9 (11,9) | 26 |
| kp2 | 12 | 11 | 11 (11,11) | 27 |
| kp1 | 3 | 11 | 11 (11,11) | 28 |
| kp2 | 13 | 11 | 11 (11,11) | 29 |
| kp2 | 15 | 12 | 11 (11,12) | 30 |
| kp1 | 4 | 12 | 12 (12,12) | 31 |
| kp2 | 16 | 16 | 12 (12,16) | 32 |
| kp1 | 5 | 14 | 14 (14,16) | 33 |
| kp2 | 17 | 17 | 14 (14,17) | 34 |
| kp1 | 6 | 14 | 14 (14,17) | 35 |
| kp1 | 7 | 17 | 17 (17,17) | 36 |
| kp2 | 18 | 18 | 17 (17,18) | 37 |

FIG. 4

| pod (Vn-1) | offset (Vn-1) | watermark (Vn-1) | watermark (Vn) |
|---|---|---|---|
| p1 | 10 | 11 | 0 |
| p2 | 11 | 13 | 0 |
| p1 | 12 | 12 | 12 |
| p2 | 13 | 14 | 12 |
| p2 | 14 | 15 | 12 |
| p1 | 15 | 12 | 12 |
| p2 | 16 | 16 | 12 |
| p1 | 17 | 12 | 12 |
| p1 | 18 | 17 | 16 |
| p2 | 19 | 16 | 16 |

500

| watermark V1 (p1, p2) | Offset (v1) | Pods (V2) | V2 adding eventtime to the payload | Out of orderliness (2s) | Watermark (V2) |
|---|---|---|---|---|---|
| 0 | 23 | p1 | 5 | 3 | 0 |
| 9 (10,9) | 24 | p2 | 4 | 2 | 2(3,2) |
| 9 (11,9) | 25 | p3 | 6 | 4 | 2 (3,2,4) |
| 9 (11,9) | 26 | p2 | 6 | 4 | 3 (3,4,4) |
| 11 (11,11) | 27 | p2 | 6 | 4 | 3 (3,4,4) |
| 11 (11,11) | 28 | p1 | 4 | 3 | 3 (3,4,4) |
| 11 (11,11) | 29 | p1 | 3 | 3 | 3 (3,4,4) |
| 11 (11,12) | 30 | p3 | 2 | drop | 3 (3,4,4) |
| 12 (12,12) | 31 | p3 | 7 | 5 | 3 (3,4,5) |
| 12 (12,16) | 32 | p2 | 8 | 6 | 3 (3,6,5) |
| 14 (14,16) | 33 | p1 | 7 | 5 | 5 (5,6,5) |
| 14 (14,17) | 34 | p2 | 9 | 7 | 5(5,7,5) |
| 14 (14,17) | 35 | p3 | 6 | 5 | 5(5,7,5) |
| 17 (17,17) | 36 | p3 | 9 | 7 | 5(5,7,7) |
| 17 (17,18) | 37 | p1 | 11 | 9 | 7(9,7,7) |

600

OFFSET-BASED WATERMARKS FOR DATA STREAM PROCESSING

INTRODUCTION

Aspects of the present disclosure relate to improved watermarks for data stream processing using time stamp and offset data shared between vertices of a directed acyclic graph (DAG) and/or to generate improved watermarks for vertices from time stamp and offset data for processing units of the vertices.

BACKGROUND

A data stream refers to a sequence of data that passes from one entity to one or more other entities in a series of instances generated over time. These instances of data can be continuously generated in sequence and may be referred to as a data pipeline. In some cases, batches of data can be processed at once. In other cases, data is generated and/or processed continuously in a stream of data that flows through the data pipeline that handles or processes the data.

Various machine learning techniques in particular often use data streams to process and learn from data instances as data elements arrive and are processed. In contrast to batch processing, processing data in a continuous stream of instances is beneficial for several reasons, but is challenging as the data is often high-dimensional, noisy, and non-stationary. Further, these problems are exacerbated when the data stream includes points where the data becomes distributed for processing.

Workflow engines can be used to facilitate data processing pipelines for data streams, but do not solve all the inherent noise and orderliness problems of the data stream. Some examples of open source workflow engines for stream data processing are Apache® Nifi, Apache® Kafka®, Apache® Storm™, Apache® Flink®, Apache® Spark™ Streaming.

A directed acyclic graph (DAG) is often used to represent the flow of data and computation in a data processing pipeline. A DAG is a graph data structure that consists of nodes and directed edges, where there is no cycle, i.e., it is not possible to start from a node and follow the directed edges to eventually reach the same node. In other words, the edges form a directed path, without forming a loop. Each node in the DAG represents a processing step, and the edges represent the flow of data from one step to another.

By using a DAG to represent the flow of data and computation, it becomes easier to understand and manage the processing pipeline, as well as to make changes to the pipeline as needed. For example processing steps can be added, removed, or modified by adding or removing nodes and edges in the DAG in the pipeline. Data at each vertex of the DAG can be processed in a parallel and distributed manner within the node or vertex. In this way, these systems can handle large volumes of data in real-time in a scalable manner and without prohibitive latency.

To ensure the completeness of data being processed in a data stream processing system using a DAG, watermarks associated with the data stream may be used. In a data stream processing system, data is processed as it arrives in real-time. However, due to differences in processing time, network delays, system failures, or other reasons, some data records may arrive late, after the processing of other records has already completed. Even a small amount of out-of-orderliness can be compounded in a complex pipeline. This can cause conflicts and other issues with completeness and accuracy of the results produced by the processing system.

Traditional data watermarks use timestamps to determine a latest time for which all data has been received and processed, or the minimum timestamp of all the data elements that have not yet been processed. By using watermarks, a data stream processing system can verify the completeness of data and what data has been received and processed before generating results.

However, traditional watermarks have several shortcomings. For example, if a record with a timestamp older than the watermark arrives, it is considered late and is typically discarded. For a data stream, a single element not being processed at a node can delay watermark propagation and/or prevent the materialization of the output. Due to the nature of parallel processing, traditional watermarks face the problem of encountering duplicates when two processes are completed at the same time by different processing units. Thus, there is a need in data streaming for improved watermarks that ensure completeness of data, ensure accurate materialization results, and track order despite late-arriving records or temporal or positional out-of-orderliness.

BRIEF SUMMARY

The present disclosure relates to a method for data stream processing. According to various embodiments, the method comprises receiving a data stream at a pipeline, the data stream comprising a plurality of data elements and the pipeline comprising a plurality of vertices; receiving, in a buffer of the data stream, a data element of the plurality of data elements at a vertex of the plurality of vertices; processing the data element at a processing unit of the vertex; generating a watermark for the processing unit, the watermark including a watermark time and an offset value corresponding to a maximum offset location written for the watermark time; storing the watermark for the processing unit in a data structure for the vertex; and determining, from the data structure, a largest valid watermark for the vertex.

Other embodiments provide processing systems configured to perform the aforementioned methods as well as those described herein; non-transitory, computer-readable media comprising instructions, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 is a table representing an example watermark assignment, according to embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure relate to improved watermarks for data stream processing using time stamp and offset data shared between vertices of a DAG and/or to generate improved watermarks for vertices from time stamp and offset data for processing units of the vertices.

In contrast to traditional batch learning, where a fixed dataset is used to train a model, machine learning on data streams involves training models on data that is constantly updating. This requires the use of specialized algorithms that can handle the dynamic nature of the data and update the model in real-time as new instances arrive.

Software systems or workflow engines may coordinate tasks such as data ingestion, pre-processing, feature extraction, model training, and prediction. The workflow engines facilitate defining, executing and managing complex data processing pipelines on streaming data, help to define and organize the different tasks that need to be performed, and manage the flow of data between such tasks. Such systems can use improved watermarks in various ways to ensure complete or correct processing of data.

Data can be divided in various ways into elements for processing. An element is considered complete when the watermark for that element indicates completeness. For a particular vertex of the data stream, a watermark value may be considered valid if all data elements with a lesser value have been fully processed, and invalid if data elements with a lesser value have not been fully processed.

As opposed to traditional timestamps, the improved watermarks of certain embodiments disclosed herein track offset and timestamp pairs for each element of the data stream at each processing unit. Generally, offset refers to the position of a record in the data stream. For example, when a record is processed for a data stream, the offset is updated to reflect a current physical position number in the stream.

The improved watermarks use a transfer of metadata in a separate data stream, such that vertices share metadata with other vertices, and such that processing units can share data with one or more vertices, separately from the data stream of the pipeline. Watermarks for data elements at a vertex are generated by consensus among pods of a watermark for an offset of the data element. Watermark consensus using a watermark that is a combination of a spatial offset component and a temporal time log component allows improved watermarking and materialization for data streaming. As such, techniques described herein ensure completeness of data, ensure accurate materialization results, track order despite late-arriving records or temporal or positional out-of-orderliness, and avoid processing delays and/or incorrect results that could otherwise occur due to order confusion in conventional techniques.

Figure 1:
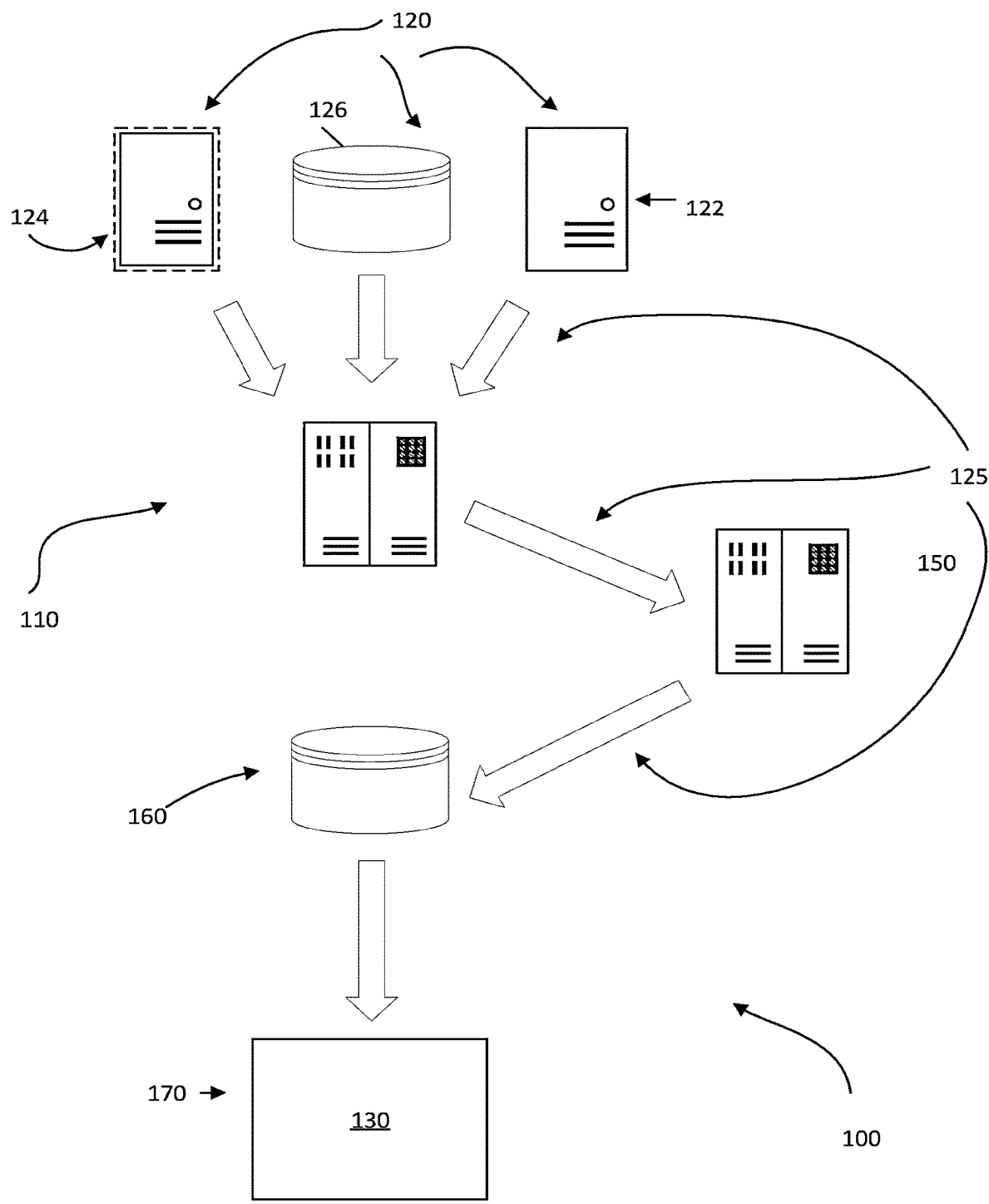
FIG. 1 is a schematic diagram of a data stream processing system, according to embodiments.

FIG. 1 is a schematic diagram of a data stream processing system, according to embodiments. As shown in FIG. 1, a data stream processing system 100 includes a data pipeline 110 beginning at one or more data sources 120, such as a server 122, virtual server 124, and/or data store 126.

A data stream 125 flows through the data pipeline 110 and is directed from the one or more data sources 110 to a data sink 130 through the data pipeline 110. In various embodiments, the data pipeline 110 can include a preprocessor or preprocessing platform 140 that collects data from one or more data sources 120 and prepares or preprocesses elements of the data stream 125. The data pipeline 110 can also include one or more processing platforms 150. At each stage of the pipeline 110, the data stream 125 can be divided into a number of partitions and/or may be directed to any number of nodes.

In embodiments, the data pipeline 110 includes one or more data stores 160. In various embodiments, data in data stream 125 is processed by the processing platform 150 and is next directed to data storage, to an application, or to another type of data sink. In the embodiments shown, the data stream 125 is directed from the one or more sources 120, to the preprocessing platform 140, to the processing platform 150, to a data store 160 and to an application 170.

Figure 2:
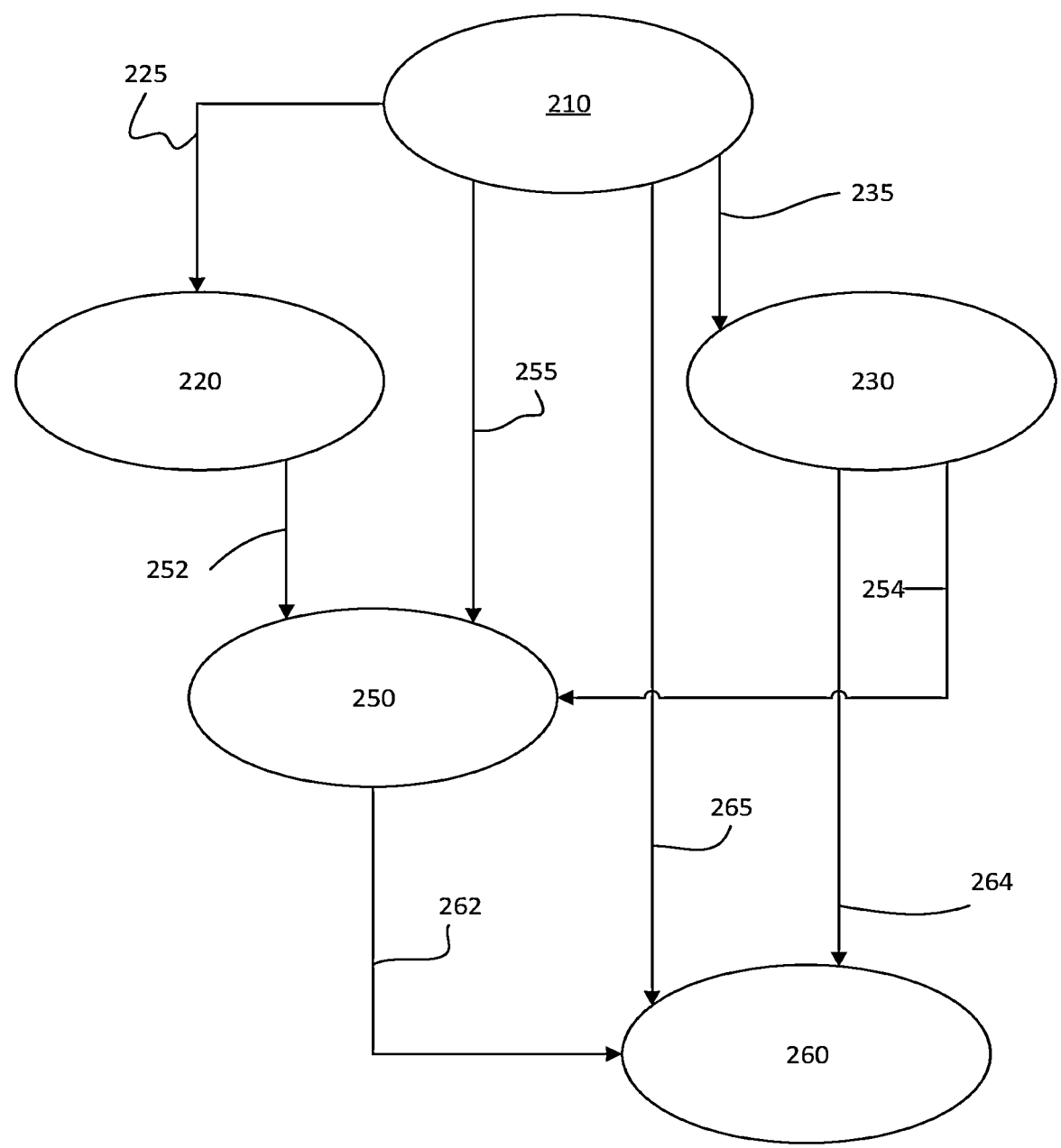
FIG. 2 is a schematic diagram of a directed acyclic graph (DAG), according to embodiments.

FIG. 2 is a schematic diagram of a directed acyclic graph (DAG), according to embodiments. A DAG can be used to model the flow of data in a data streaming pipeline, such as that of FIG. 1. A DAG can include a root vertex and any number of other vertices connected to the root vertex in a directed and acyclic manner.

In the example DAG 200 of FIG. 2, a root vertex 210 is connected to a second vertex 220 along a directed edge 225, a third vertex 230 along a directed edge 235, a fourth vertex 250 along a directed edge 255, and a fifth vertex 260 along a directed edge 265. The second vertex 220 is connected to the fourth vertex 250 along a directed edge 252. The third vertex 230 is connected to the fourth vertex by a directed edge 254. The third vertex 240 is connected to the fifth vertex 260 along a directed edge 262. The fourth vertex 250 is connected to the fifth vertex 260 by a directed edge 264. A DAG can have any number of vertices and edges, and can be used to represent instances occurring in a stream of data.

In a stream data processing system, the concept of a DAG can be used to model the relationships between different processing tasks, such as data ingestion/collection, data pre-processing, processing, model training, prediction, etc. For example, the data ingestion task might feed into the data pre-processing task, which in turn might feed into a training task, which might feed into other tasks, and so on. A DAG can be used to represent source-sink relationships between each processing step of a data stream.

Figure 3:
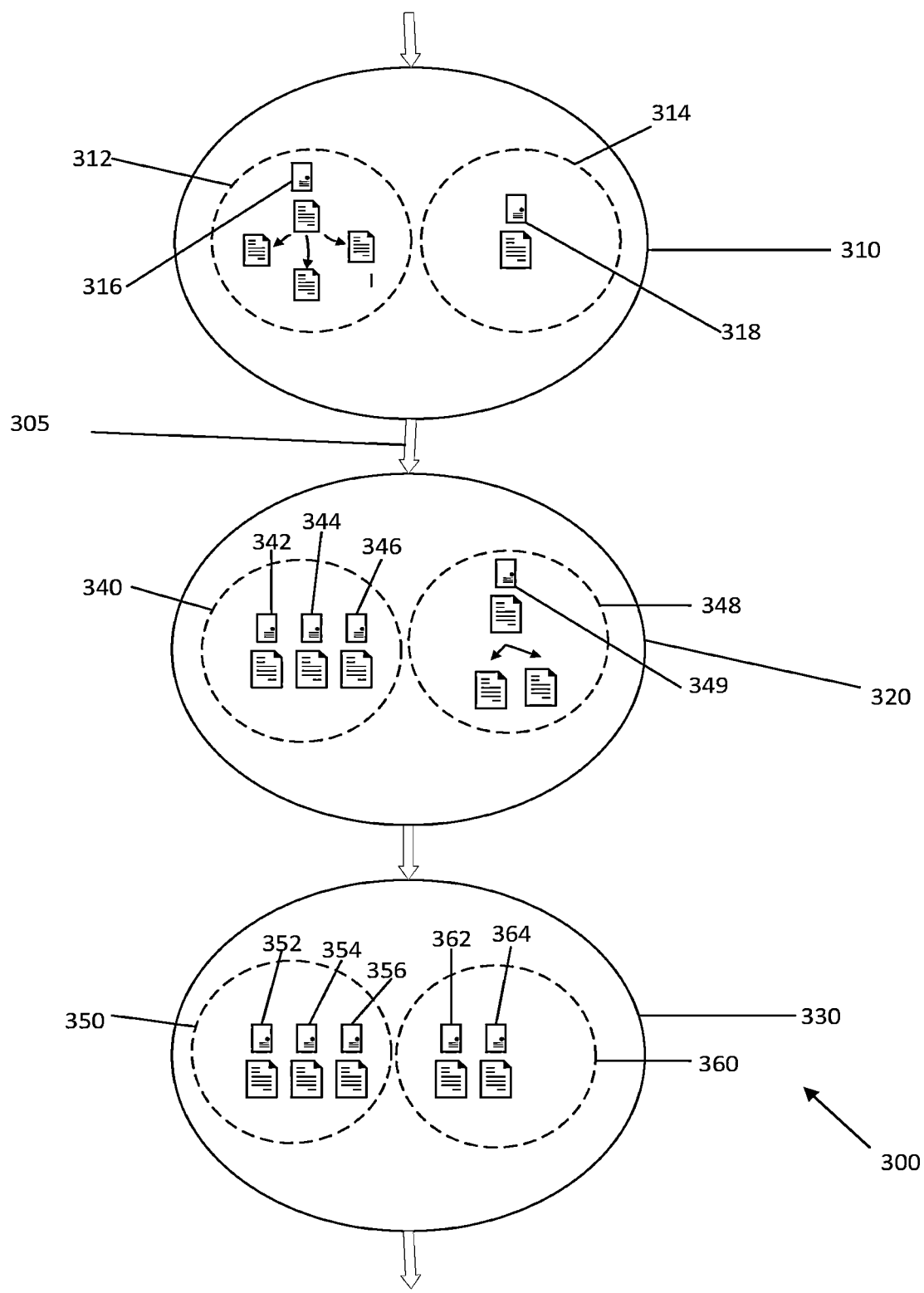
FIG. 3 is a schematic diagram of data stream processing, according to embodiments.

FIG. 3 is a schematic diagram of data stream processing, according to embodiments. As shown in FIG. 3, a series of vertices of a data processing system are arranged in a DAG 300 through which a data stream 305 of a data pipeline flows. The DAG 300 includes a first vertex 310, a second vertex 320, and a third vertex 330. In the example shown, the first vertex 310 includes a first processing pod 312 and a second processing pod 314. The first processing pod 312 includes a first processing unit 316 at which data of the data stream is partitioned into three partitions. The second processing pod 314 including a second processing unit 318.

The second vertex 320 includes a third pod 340 comprising a third processing unit 342, a fourth processing unit 344, and a fifth processing unit 346. The second vertex also includes a fourth pod 348 at which it is determined that data of the stream is partitioned into two partitions. The fourth pod 348 includes a sixth processing unit 349.

The third vertex 330 includes a fifth pod 350 comprising a seventh processing unit 352, an eighth processing unit 354, and a ninth processing unit 356. The third vertex 330 also includes a sixth pod 360 including a tenth processing unit 362 and an eleventh processing unit 364.

A data pipeline can include any number of such vertices (e.g., 310, 320, 330), at which any number of processes may be performed at any number of processing units. Further, the processing units may determine that partitioning of the data and/or one or more child sub-processes are needed for the data element being processed by the unit. Each vertex of the DAG may have any number of processing pods associated therewith, and each processing pod may have any number of processing units associated therewith. Further still, multiple partitions in the data stream can be directed to a same process of a vertex. Regardless, the processing units can be regarded as being represented by nodes of a DAG. Thus, the arrangement of FIG. 3 is exemplary and not limiting in nature.

In some cases, processing pods may be added or removed to automatically scale the processing capability of a vertex. For example, certain data elements received at a vertex may require relatively more processing capability and other data elements less processing capability. If necessary, watermark progression can be paused while an auto-scaling mechanism adjusts the number of processing units or hubs of a vertex.

For example, a vertex Vn−1 is a source for vertex Vn. When the Vn−1 processing units complete a process faster than the Vn processing units, it is possible that, when computing a watermark for a given event, there is not a valid watermark for Vn−1. In some applications a double linked list storing a time stamp and offset timeline may have a cap on window length causing the older entries to have been truncated. In such cases, the offset of the given event is smaller than the offset of the last watermark in the double linked list. Therefore, in some embodiments, a vertex or processing unit of a vertex may pause the watermark progressing until an auto-scaling mechanism generates more Vn processing units.

FIG. 4 is a table representing an example watermark assignment, according to embodiments. The table 400 of FIG. 4 demonstrates watermark assignment within a vertex having more than one processing unit, according to embodiments.

In the example of FIG. 4, a data stream is partitioned into a first partition kp1 and a second partition kp2. The first partition kp1 corresponds to offsets 1-9. The second partition kp2 corresponds to offsets 10-18. The partition corresponding to each row is shown in column 410. Each element of the first partition and each element of the second partition has a terminal offset shown in the terminal offset column 420. Each elements also includes a log append time shown in the log append time column 430.

In some cases, the elements have a terminal offset value in a double linked list where the terminal offset values are paired with respective watermarks. In various applications, the offset may be defined by data memory barriers, data synchronization barriers, instruction synchronization barriers, etc. The watermarks can comprise offset, watermark pairs or offset, time stamp pairs. Offset, time stamp pairs can be used when data is first ingested. In such cases the time stamp can represent an ingestion time.

In the example shown, the first partition kp1 is processed at a first processing unit of a vertex, and a second partition is processed at a second processing unit of the vertex. Each data element may have a time stamp component corresponding to when processing of the element is complete. Each data element may also have an offset component corresponding to when the processing of the element is complete. A log or record is maintained for each element, for example a log of events or changes. In some embodiments, a log of append times is maintained for that includes an array of append times corresponding to time records for data elements. In some embodiments, the time can be the completion time for processing of the data element. In other cases, an event time contained in the data payload can also be used, such as a condition in the payload triggering a recording of an event time into the log.

Due to differences in processing time or for other reasons, the log append time for data elements on the second partition kp2 can be earlier than for data elements of the first partition kp1, even though the second partition kp2 corresponds to higher-numbered offsets and/or may have been received later in the queue of data elements of the data stream.

As shown in V1 watermark column 440, a watermark for the vertex V1 is the lowest value of the append time for elements already processed. In the example, the lower value of the log append time for the first partition and the log append time for the second partition is the watermark time stamp value. In the example shown, a watermark 450 includes this timestamp value 454 in a data structure with the current appended time stamp log 458 for the first partition and the second partition.

The data stream at the vertex may be partitioned into any number of partitions. However, the watermark time stamp value will always be monotonically increasing with respect to the offset of the outgoing data queue to a sink for the vertex. The instruction synchronization barrier offset for V1 is given in V1 ISB offset column 460

Figure 5:
FIG. 5 is a table representing an example of watermark propagation between vertices, according to embodiments.

FIG. 5 is a table representing an example of watermark propagation between vertices, according to embodiments. At step 510, pod 1 and pod 2 have not yet processed their respective first elements, so the watermark for the vertex is 0. The first element of pod 1 at offset 10 is processed, and the watermark for that offset for pod 1 is 11. At step 520, the first element of pod 2, at offset 11 is processed. The vertex watermark remains zero since pod 1 did not yet complete processing of the element at offset 10. At step 530, the second element of pod 1, at offset 12, is processed. The watermark for offset 12 is 12. The offset for the vertex is set to 12, since pod 1 has a watermark of 12, and pod 2 has a watermark of 13, and 12 is the lower of these values.

At step 540 of the example, processing pod 2 processes an element at offset 16 with watermark 16. However, the vertex watermark time stamp does not change, because the greatest watermark associated with pod 1 is still 12.

In the example shown, the vertex watermark time stamp does not change again until step 550. At step 550, processing pod 1 processes an element with offset 18 and watermark 17. Prior to this step, the largest watermark for pod 1 (at offsets 10, 12, 15, and 17) had been 12, so the vertex watermark time stamp did not change. The watermark at step 550 for pod 1 at offset 18 is 17. However, the vertex watermark time stamp at step 550 is set to 16, and not 17, because the watermark time stamp is set to the lowest of pod 1 and pod 2 and because the watermark for pod 2 has not progressed beyond watermark 16 (at step 540).

It is noted that a vertex can have any number of pods, and the pods may have any number of processing units. Regardless, the vertex watermark will be monotonically increasing.

Figure 6:
FIG. 6 is a table showing an example of watermark determination for a vertex, according to embodiments.

FIG. 6 is a table showing an example of watermark determination for a vertex, according to embodiments. The table 600 of FIG. 6 demonstrates a method of watermark propagation between a source vertex (V1) and a sink vertex (V2) for a queue of data elements represented by rows in the table. Watermarks for the source vertex are shown in column 610 and include a time stamp component and an offset timeline component. For both V1 and V2, the time stamp component is the minimum value of the offset timeline component.

In the example of FIG. 6, the table is organized by a first watermark column 610 for V1, which also corresponds to the ordering of offset column 620 for the data element at V1. The watermarks for V1 and V2 include a time stamp portion and an offset timeline component which provides a time stamp for each pod of the vertex for a particular offset.

As shown, V2 has three processing pods and V1 has two processing pods. The V2 processing pod column 630 shows which processing pod each element of the data stream is directed to at V2. Each element of the data stream has a corresponding event time at which the element is added to the payload at V2. The payload event time column 640 of FIG. 6 provides the event time for each element of the data stream.

In FIG. 6, out-of-orderliness has occurred between V1 and V2. The out-of-orderliness column 650 provides the out-of-orderliness for each element of the data stream. The out-of-orderliness represents a time stamp corresponding to each data element for an amount of time for that offset.

Example watermarks for V2 are provided in the V2 watermark column 660. The watermarks for V2 include a time stamp component that is the lowest value of the offset timeline component, where the offset timeline component is an array comprising a time stamp for each pod of the vertex. In the example shown, the time stamps for each pod of the vertex correspond to a current maximum out-of-orderliness time for the processing pod. As shown, the watermarks for V1 and V2 are monotonically increasing despite out-of-orderliness occurring.

In the examples shown, a watermark can include an event time for a data element, such as a processing time or a time the element is added to a payload. In other cases, a watermark may include an ingestion time for the data element, such as an ingestion time into a pipeline.

Figure 7:
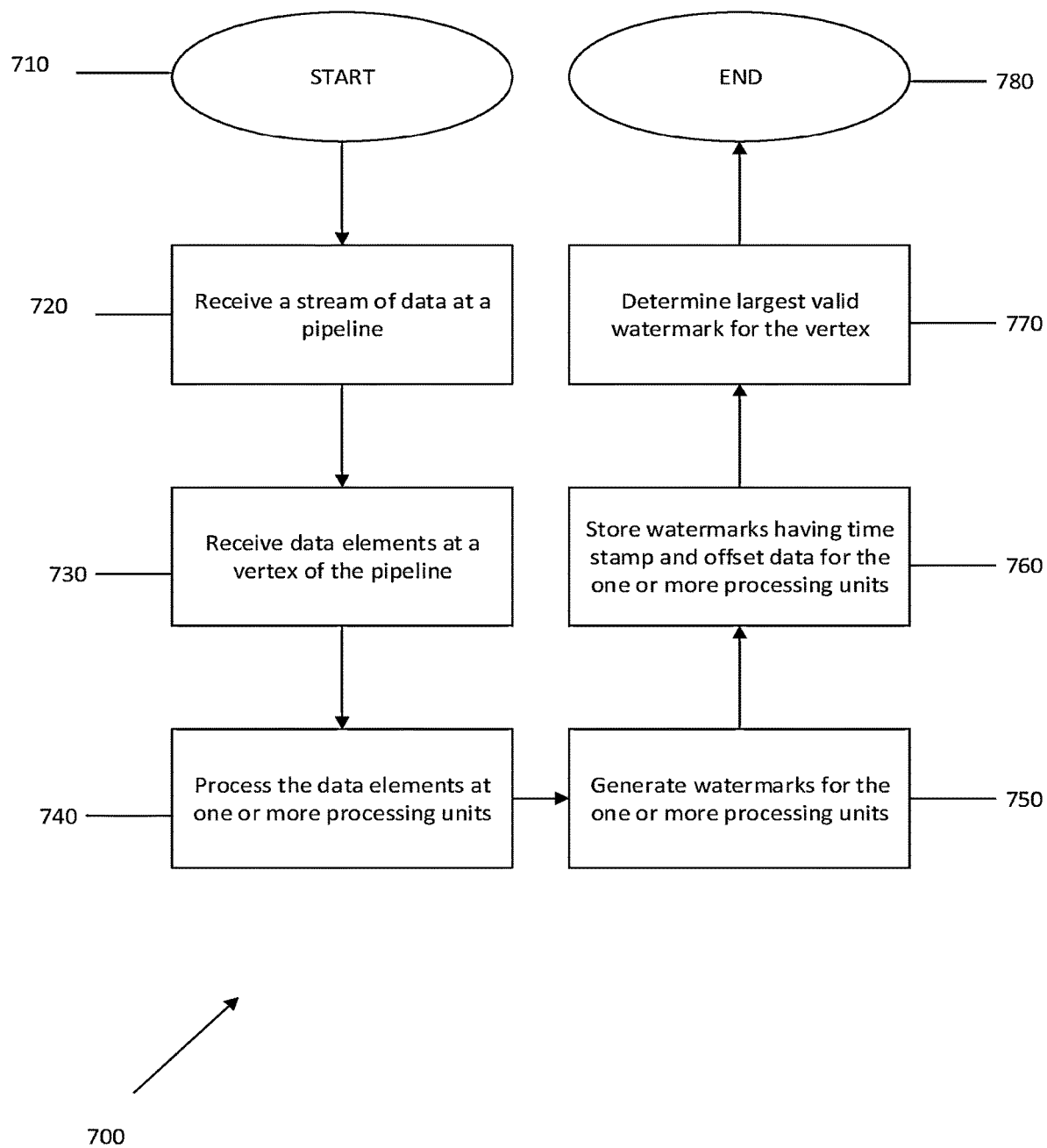
FIG. 7 is a flow chart demonstrating a method of watermarking a continuous data stream, according to embodiments.

FIG. 7 is a flow chart of a method 700 of watermarking a continuous data stream, according to embodiments.

In various embodiments, the method 700 can be executed by one or more processing units of a computing system. The method 700 begins at starting block 710 and proceeds to stage 720 where a stream of data is received at a data pipeline. For example, a data pipeline can be a series of processing steps in a machine learning stream. The processing steps can be represented as a DAG, since each step can be represented by a vertex having a source and/or sink in a directed, acyclic fashion.

From stage 720 where a stream of data is received at a data pipeline, the method 700 may proceed to stage 730 where data elements are received at a vertex of the pipeline. In various embodiments, the vertex can include any number of processing pods. Each processing pod can include any number of processing units. For example, multiple containers running on a plurality of processing pods at a vertex can be used for data where the data is broken up into multiple processes each having a data partition.

From stage 730 where data elements are received at a vertex of the pipeline, the method 700 may proceed to stage 740 where the data elements are processed at one or more processing units. The data for each process can be partitioned any number of times as needed by the processing task of each pod. For example, a first plurality of pods of a vertex may contain two processing units, a second plurality of pods of a vertex may contain three processing units, and so forth.

From stage 740 where the data elements are processed at one or more processing units, the method 700 may proceed to stage 750 where watermarks are generated for the one or more processing units. For example, the processing units can record a time stamp when processing of a data partition is complete. The processing units can also record an offset for the data partition when the data partition is complete. For embodiments having multiple processing pods, the watermark for each pod is the minimum value of the log append times for each data partition of the processing units of the respective pod.

From stage 750 where watermarks are generated for the one or more processing units, the method 700 may proceed to stage 760 where watermarks having time stamp and offset data for the one or more processing units are stored. In various embodiments, the watermarks comprise a double linked list having a time stamp component and an offset timeline component. In embodiments, the offset timeline comprises an array of time stamp values corresponding to each pod of the vertex for a particular offset.

From stage 760 where watermarks having time stamp and offset data for the one or more processing units are stored, the method 700 may proceed to stage 770 where a largest valid watermark for the vertex is determined. In some embodiments, the largest valid watermark for the vertex comprises a largest valid time stamp of an array of time stamp values corresponding to each pod of the vertex.

From stage 770 where a largest valid watermark for the vertex is determined, the method 700 may conclude at ending block 780.

Figure 8:
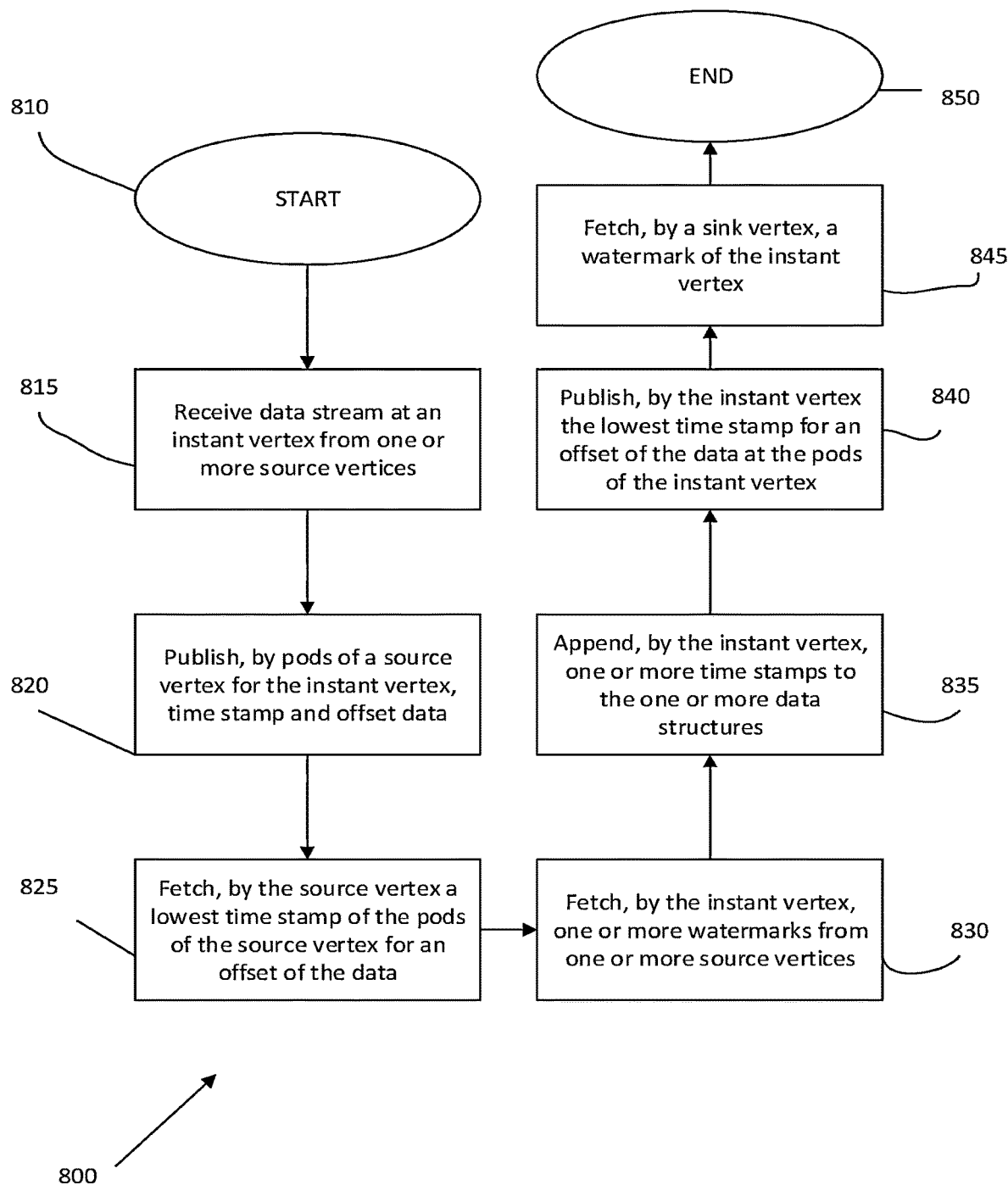
FIG. 8 is a flow chart demonstrating a method of watermarking a continuous data stream, according to embodiments.

FIG. 8 is a flow chart demonstrating a watermark propagation method 800 according to embodiments. For example, a data pipeline may be represented by a DAG having a plurality of vertices in a source—sink relationship. For a particular vertex of the pipeline, a queue of data elements can be input from a source vertex and/or output to a sink vertex.

The method 800 of FIG. 8 begins at starting block 810 and proceeds to stage 815 where a data stream is received at an instant vertex from one or more source vertices.

From stage 815 where a data stream is received at an instant vertex from one or more source vertices, the method 800 may proceed to stage 820 where pods of a source vertex for the instant vertex publish time stamp and offset data. For example, the vertex can publish a double linked built from a plurality of offset to timestamp mappings of events (such as an appending to a log or an event in a payload) for each processing pod and/or unit. Publishing can occur periodically, with a variable or predetermined periodicity.

From stage 820 where pods of a source vertex for the instant vertex publish time stamp and offset data, the method 800 may proceed to stage 825 where the instant vertex fetches a lowest time stamp of the pods of the source vertex for an offset of the data. For example, the instant vertex can fetch a double linked list, array, or other data structure from the source vertex. In various embodiments, the instant vertex can fetch data from any number of sources vertices, including vertices that are sources of source vertices.

In some embodiments, fetching can occur periodically, with a variable or predetermined periodicity. For structures with multiple vertices, a "heartbeat" mechanism can be used to maintain consistency of the data, and/or various consensus algorithms may be applied to maintain consistent and accurate data sharing for a large number of vertices.

From stage 825 where the source vertex fetches a lowest time stamp of the pods of the source vertex for an offset of the data, the method 800 may proceed to stage 830 where the instant vertex fetches one or more watermarks from one or more source vertices. In various embodiments, a watermark that is a source of the instant vertex, or a source of a source of the instant vertex, and so forth, can be fetched.

From stage 830 where the instant vertex fetches one or more watermarks from one or more source vertices, the method 800 may proceed to stage 835 where one or more time stamps are appended to one or more data structures. For example, data elements or partitions processed at the instant vertex have an offset and a time stamp. In some embodiments, a terminal offset and a time stamp associated with completion of the data element or partition being processed can be included in a data structure used to watermark the completion of the data stream. In various embodiments, a double linked list is used to store time stamp and offset data. The time stamp and offset data for each data element or partition is stored and published periodically by the processing units and/or processing pods of the vertex.

From stage 835 where one or more time stamps are appended to one or more data structures, the method 800 may proceed to stage 840 where the instant vertex publishes a lowest time stamp for an offset of the data at the pods of the instant vertex. For example, given a particular offset, the instant vertex can determine the lowest time stamp value for a terminal offset of a data element or partition processed at a processing unit of a pod of the instant vertex.

From stage 840 where the instant vertex publishes a lowest time stamp for an offset of the data at the pods of the instant vertex, the method 800 may proceed to stage 845 where a sink vertex fetches a watermark of the instant vertex. For example, a lowest time stamp for the instant vertex can be fetched by the sink vertex. In some embodiments, the sink vertex fetches a double linked list of pod time stamp and offset information for the vertex. From stage 845 where a sink vertex fetches a watermark of the instant vertex the method 800 may proceed to conclude at ending block 850.

Auto-Scaling of Pods

In various embodiments, the watermark per pod can be represented by an array. This enables the watermark to be time sorted by the watermark time stamp component. Further, the offset value for the watermark is defined as the maximum offset location written for that watermark time. The offsets for data elements of a pod therefore are determined by comparing the value of offsets between one or more timestamps to determine a least time value among the time values.

In various embodiments, watermarks are stored at a key-value store. For example, a key-value store namespaced by a data bucket for a vertex can store a list of pods of the vertex, and/or other vertices, and a watermark including a time stamp element corresponding to the terminal offset at each pod. In embodiments, watch commands may listen for changes to the key-value store in which watermarks are stored.

In various embodiments, lists of active pods for one or more particular vertices are stored at one or more vertices at a given time for the pipeline. In some embodiments, a heartbeat mechanism is used to maintain and/or share a list of active pods. For each vertex, a per-pod data structure stored as a sorted set with an identified for the pod as the key and with a heartbeat value as the score can be used to query a status of each pod. The data structure can be reused for checking or maintaining information about stale or dead pods.

In example embodiments, for a given set of n or more vertices, every pod in vertex $V_n$ tracks data for pods in $V_{n-1}$. An offset-timeline for the pods of $V_{n-1}$ is published to and/or fetched by the vertex $V_n$. In embodiments, a pod store data structure is updated periodically using a watch command that detects, for example, new pods, updated pods, or deleted pods, or other changes to the data bucket for the vertex $V_{n-1}$.

In certain embodiments, there are three different cases of pod startup: a completely new pod, a clean pod, and an unclean pod. For the case where a new pod is added, which was never seen by the system before, or a case where the pod was successfully removed and is back after a long time (e.g., auto-scaling), a watermark other than zero is used as an initial watermark for the pod. In some cases, the watermark may be set to avoid retrogressing of the watermark. Rather than zero, a "heartbeat" routine can be used to determine an initial watermark for new pods. This can be done by determining and copying the slowest pod's top watermarks for a vertex. The new pod can then be inserted at a vertex and is enabled to implement publish and fetch interfaces of the vertex.

A clean pod refers to a case where a pod comes back immediately (part of active processing) after a successful stop. An example of this is pod migration. This can be handled in the same way as a completely new pod. The initial watermark can be set to the lowest watermark of all the current pods in that vertex.

An unclean pod refers to a case where a pod comes back immediately (part of active processing) after a crash or unsuccessful or force stop. An example of this is code panics, RunTimeExceptions, etc. Since the pod crashed, and if it is back immediately, a previously published watermark can be used for the pod. For example, the most recent watermark published before the crash can be used for the pod. In some embodiments, after expiration of a particular time interval the earlier watermark timelines for a pod can be considered stale and another technique may be applied. In some embodiments a payload is redelivered after the expiration of particular time interval if no acknowledgements are received from the pod.

In certain embodiments, vertices may implement a Fetch-Watermark interface that is push-based. In such cases the data may be propagated immediately, and a pod can itself delete all its own metadata. For example, for a pod in $V_{n-1}$ shutting down, the $V_n$ vertex would have captured the final entry of the shutting down pod in its timeline, i.e. by fetching per-pod data from the data bucket.

In various embodiments, one or more of the following may happen during pod shutdown: (1) the pod inserts a final time to offset mapping into the data bucket for the vertex; (2) the pod deletes itself from the data bucket; (3) a value for the pod is updated by a heartbeat routine of a vertex.

Interface of Vertices

In the data pipelines of example embodiments, the watermark propagates from a first source vertex to a last sink vertex. The watermark is generated at the source based on the event-time, and if the event time is missing, it will be the ingestion time (the time the data was inserted into the pipeline). Once the watermark is created, it flows through the subsequent vertices of the pipeline. Each vertex can be considered as a source, processor, and/or sink. Various embodiments ensure the watermark can flow through vertices by implementing one or more of a Publish-Watermark interface and a Fetch-Watermark interface.

The Publish-Watermark interface enables sharing of per-processing unit—per-vertex information. A Publish-Watermark operation publishes the watermark of each pod of a vertex. The watermark for the vertex is determined based on the watermarks for each pod of the vertex.

The Fetch-Watermark interface enables retrieving a merged watermark for a vertex corresponding to all processing units at the vertex. In some cases, a vertex Vn can fetch the watermarks of all the pods of the vertex Vn−1. The watermark for the vertex Vn−1 for a given offset is based on the watermark for that offset for each pod of Vn−1. The lowest watermark among all the pods will be set as the watermark of that offset. Thus, the Fetch-Watermark is able to fetch data representing a list of all the pods in Vn−1 and/or a heartbeat score for the pod, and a corresponding offset timeline for each pod in Vn−1.

Example Offset-Timeline Store

In example watermarks, the watermark includes a time stamp and an offset-timeline. The offset-timeline includes a list of offsets for processing units of the vertex. In some cases, the offset is a buffer's offset between an edge of a Vn−1 and a Vn vertex. The offset-Timeline store at Vn includes a timeline of time to offset mapping for each pod in Vn−1. This timeline will be used to determine the watermark of an offset. For example, the watermark of an offset for a vertex is the minimum watermark among all the pods of that vertex.

In embodiments, a watch operation automatically detects updates of pods of a vertex for an offset to timestamp mapping event and the data bucket for the vertex is automatically updated in response to an event being detected. The timestamp mapping events can be stored in a double-linked-list (DLL), sorted by timestamp and value as the offset. In this way, an offset-timeline store is generated based on timestamp mapping events.

In some embodiments, the double linked list may have a predetermined window length cap to prevent the double linked list from growing indefinitely. In an example embodiment, a window length of 86400 slots is used. In an example embodiment, a granularity of one second is used. In other embodiments, a granularity of one millisecond can be used. In other cases, larger or smaller window lengths and/or granularities can be used.

In various embodiments, a consensus algorithm can be used to maintain (i.e. fetch and publish, or pull/push) the time stamp and offset time line data for the watermarks for each processing pod. A consensus algorithm ensures that all vertices agree on a maximum valid watermark value, even in the presence of failures, network delays, or other issues. Consensus algorithms facilitate consistency and conflict resolution. In various embodiments, consensus algorithms could include Paxos, RAFT, Nakamoto consensus, and/or Byzantine fault tolerance (BFT).

It is noted, however, that a consensus algorithm is not used for some embodiments. In certain embodiments, a heartbeat routine using a message bus (which may be virtual or software-based) can be used to maintain and/or update the time stamp and offset time line data. The data in some embodiments is centrally aggregated, however it is anticipated that data storage of time stamp and offset timeline data could be distributed, and maintained at the processing units rather than a central data structure for a vertex.

ADDITIONAL CONSIDERATIONS

Aspects of the present invention may be applicable to a variety of data streaming platforms. In various embodiments, a data streaming platform may enable insertion of a time stamp into a time stamp log or record. A data streaming platform may further enable strictly ordered partitioning of a stream of data. Alternatively, instead of appending time stamp information to the log or record, an event time could be included in a payload of the data. In some cases, the data may have a schema and may be parsable by lightweight data streaming platforms.

In certain embodiments, a RAFT protocol or other consensus algorithm is used to determine the watermark for a vertex based on the offset-timelines of each pod of the vertex. For example, a consensus algorithm may be used to determine a watermark of the vertex by facilitating publishing of offset-timeline data by each pod and fetching merged watermarks by the vertex.

In certain embodiments, it may be preferable that the watermark is not tracked for each offset read at a vertex. Rather, applying watermarking techniques to less than every offset can increase throughput and may be preferable in certain applications for this reason. For example, sampling or batching techniques for the offsets may improve throughput without violating other constraints.

It is anticipated that aspects of the present invention apply in cases where watermarks are computed and/or stored at every processing unit of a pipeline. However, in other cases the watermark data, in part or in whole, is centrally aggregated to a data store and pushed to the processing units in the vertices.

In some embodiments, watermarking of a data pipeline can be disabled at a first source vertex. In other embodiments, watermarking at a first source is disabled and watermarking is enabled at later vertex. For example, watermarking at a later vertex may be required if there is custom encoding of the data and the first source vertex is not be able to assign watermark.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for data stream processing, comprising:
   receiving a data stream at a pipeline, the data stream comprising a plurality of data elements and the pipeline comprising a plurality of vertices;
   receiving, in a buffer of the data stream, a data element of the plurality of data elements at a vertex of the plurality of vertices;
   processing the data element at one or more processing units of the vertex;
   generating a watermark for the one or more processing units, the watermark including a watermark time and an offset value corresponding to a maximum offset location written for the watermark time; and
   storing the watermark for the one or more processing units in a data structure for the vertex; and
   determining, from the data structure, a largest valid watermark for the vertex.

2. The method of claim 1, wherein the vertex comprises a plurality of processing pods each comprising one or more processing units, the one or more processing units of the vertex comprises a one or more processing units of a first processing pod, and the method further comprises fetching a merged watermark for the vertex, the merged watermark comprising a lowest time record of the plurality of processing pods corresponding to a given offset.

3. The method of claim 1, wherein the data stream is continuous, the plurality of vertices comprises a directed acyclic graph having a source vertex that is an event streaming platform supporting, for the plurality of data elements, timestamp creation, timestamp log appending, automatic scaling of pods, and partitioning of data.

4. The method of claim 1, wherein the vertex is a sink for a source vertex of the plurality of vertices, the one or more processing units includes a list of processing pods of the source vertex, and the method further comprises determining, for the offset value, a lowest time record of a plurality of time records of pods of the source vertex, and storing the lowest time record in a merged watermark of the source vertex.

5. The method of claim 1, wherein the one or more processing units periodically publishes a plurality of watermarks to the vertex and the method further comprises fetching, by the vertex, for a given offset, a plurality of watermarks for the one or more processing units, and determining a lowest time record of the plurality of watermarks.

6. The method of claim 1, wherein the vertex uses a consensus algorithm to determine a merged watermark corresponding to a specified offset and a minimum event time of a plurality processing units of the vertex for the specified offset.

7. The method of claim 1, wherein a processing unit of the one or more processing units is a first processing unit of a plurality of processing units, and the data structure comprises a double linked list built from a plurality of offset to timestamp mappings of events corresponding to one or more updates of the plurality of processing units.

8. The method of claim 7, wherein the double linked list has a capped window length and a specified granularity.

9. A non-transitory computer readable storage medium comprising instructions, that when executed by one or more processors of a computing system, cause the computing system to:
   receive a data stream at a pipeline, the data stream comprising a plurality of data elements and the pipeline comprising a plurality of vertices;
   receive, in a buffer of the data stream, a data element of the plurality of data elements at a vertex of the plurality of vertices;
   process the data element at one or more processing units of the vertex;
   generate a watermark for the one or more processing units, the watermark including a watermark time and an offset value corresponding to a maximum offset location written for the watermark time; and store the watermark for the one or more processing units in a data structure for the vertex; and determine, from the data structure, a largest valid watermark for the vertex.

10. The non-transitory computer readable storage medium of claim 9, wherein the vertex comprises a plurality of processing pods each comprising one or more processing units, and the instructions, when executed by the one or more processors of the computing system, further cause the computing system to fetch a merged watermark for the vertex, the merged watermark comprising a lowest time record of the plurality of processing pods corresponding to a given offset.

11. The non-transitory computer readable storage medium of claim 9, wherein the data stream is continuous, the plurality of vertices comprises a directed acyclic graph having a source vertex that is an event streaming platform supporting, for the plurality of data elements, timestamp creation, timestamp log appending, automatic scaling of pods, and partitioning of data.

12. The non-transitory computer readable storage medium of claim 9, wherein the vertex is a sink for a source vertex of the plurality of vertices, the one or more processing units includes a list of processing pods of the source vertex, and the instructions, when executed by the one or more processors of the computing system, further cause the computing system to determine, for the offset value, for the offset value, a lowest time record of a plurality of time records of pods of the source vertex, and storing the lowest time record in a merged watermark of the source vertex.

13. The non-transitory computer readable storage medium of claim 9, wherein the one or more processing units periodically publish a plurality of watermarks to the vertex and the instructions, when executed by the one or more processors of the computing system, further cause the computing system to fetch, by the vertex, for a given offset, a plurality of watermarks for the one or more processing units, and determining a lowest time record of the plurality of watermarks.

14. The non-transitory computer readable storage medium of claim 9, wherein the vertex uses a consensus algorithm to determine a merged watermark corresponding to a specified offset and a minimum event time of a plurality processing units of the vertex for the specified offset.

15. A system, comprising:
a memory having executable instructions stored thereon; and
one or more processors configured to execute the executable instructions to cause the system to:

receive a data stream at a pipeline, the data stream comprising a plurality of data elements and the pipeline comprising a plurality of vertices;

receive, in a buffer of the data stream, a data element of the plurality of data elements at a vertex of the plurality of vertices;

process the data element at one or more processing units of the vertex;

generate a watermark for the one or more processing units, the watermark including a watermark time and an offset value corresponding to a maximum offset location written for the watermark time; and store the watermark for the one or more processing units in a data structure for the vertex; and determine, from the data structure, a largest valid watermark for the vertex.

16. The system of claim 15, wherein the vertex comprises a plurality of processing pods each comprising one or more processing units, and the one or more processors are further configured to execute the executable instructions to cause the system to fetch a merged watermark for the vertex, the merged watermark comprising a lowest time record of the plurality of processing pods corresponding to a given offset.

17. The system of claim 15, wherein the data stream is continuous, the plurality of vertices comprises a directed acyclic graph having a source vertex that is an event streaming platform supporting, for the plurality of data elements, timestamp creation, timestamp log appending, automatic scaling of pods, and partitioning of data.

18. The system of claim 15, wherein the vertex is a sink for a source vertex of the plurality of vertices, the one or more processing units includes a list of processing pods of the source vertex, and the one or more processors are further configured to execute the executable instructions to cause the system to determine, for the offset value, a lowest time record of a plurality of time records of pods of the source vertex, and storing the lowest time record in a merged watermark of the source vertex.

19. The system of claim 15, wherein the one or more processing units periodically publishes a plurality of watermarks to the vertex and the one or more processors are further configured to execute the executable instructions to cause the system to fetch, by the vertex, for a given offset, a plurality of watermarks for the one or more processing units, and determining a lowest time record of the plurality of watermarks.

20. The system of claim 15, wherein the vertex uses a consensus algorithm to determine a merged watermark corresponding to a specified offset and a minimum event time of a plurality processing units of the vertex for the specified offset.

* * * * *